(12) United States Patent
Nagato et al.

(10) Patent No.: US 11,222,267 B2
(45) Date of Patent: Jan. 11, 2022

(54) IMAGE INSPECTION APPARATUS, IMAGE INSPECTION LEARNING METHOD, AND NON-TRANSITORY COMPUTER-READABLE STORAGE MEDIUM FOR STORING IMAGE INSPECTION PROGRAM

(71) Applicant: FUJITSU LIMITED, Kawasaki (JP)

(72) Inventors: Tsuyoshi Nagato, Isehara (JP); Hiroaki Okamoto, Atsugi (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 16/676,503

(22) Filed: Nov. 7, 2019

(65) Prior Publication Data

US 2020/0202225 A1 Jun. 25, 2020

(30) Foreign Application Priority Data

Dec. 20, 2018 (JP) .............................. JP2018-238353

(51) Int. Cl.
*G06N 3/12* (2006.01)
*G06N 5/04* (2006.01)
(Continued)

(52) U.S. Cl.
CPC ........... *G06N 3/126* (2013.01); *G06K 9/2054* (2013.01); *G06K 9/4661* (2013.01); *G06K 9/628* (2013.01); *G06K 9/6218* (2013.01); *G06K 9/6256* (2013.01); *G06K 9/6262* (2013.01); *G06N 5/003* (2013.01); *G06N 5/04* (2013.01); *G06T 7/0004* (2013.01); *G06T 2207/20081* (2013.01)

(58) Field of Classification Search
CPC .......... G06N 3/126; G06N 5/003; G06N 5/04; G06K 9/2054; G06K 9/4661; G06K 9/6218; G06K 9/6256; G06K 9/6262; G06K 9/628; G06T 7/0004; G06T 2207/20081

See application file for complete search history.

(56) References Cited

U.S. PATENT DOCUMENTS

2014/0362281 A1* 12/2014 Yamada ............... H04N 5/2355
    348/362
2019/0287235 A1* 9/2019 Ikeda .................... G06T 7/0008

FOREIGN PATENT DOCUMENTS

JP     2008-204102 A    9/2008
JP     2008-299687 A    12/2008

* cited by examiner

*Primary Examiner* — David F Dunphy
(74) *Attorney, Agent, or Firm* — Fujitsu Patent Center

(57) ABSTRACT

An image inspection learning method implemented by a computer, the method includes: generating non-defective region data obtained by extracting, from a learning image including a defective region, a non-defective region other than the defective region; inputting the learning image into an image processing program for image inspection that detects the defective region in an input image as a detection target for the defective region, and acquiring an output image; extracting a feature quantity for a predetermined region of the output image; classifying, based on the non-defective region data, the feature quantity for the predetermined region into a non-defective feature quantity corresponding to the non-defective region and a defective feature quantity corresponding to the defective region; and using the non-defective feature quantity to learn a discriminator that discriminates a region of the output image outputted from the image processing program.

18 Claims, 9 Drawing Sheets

(51) Int. Cl.
*G06N 5/00* (2006.01)
*G06T 7/00* (2017.01)
*G06K 9/62* (2006.01)
*G06K 9/46* (2006.01)
*G06K 9/20* (2006.01)

IMAGE INSPECTION APPARATUS, IMAGE INSPECTION LEARNING METHOD, AND NON-TRANSITORY COMPUTER-READABLE STORAGE MEDIUM FOR STORING IMAGE INSPECTION PROGRAM

CROSS-REFERENCE TO RELATED APPLICATION

This application is based upon and claims the benefit of priority of the prior Japanese Patent Application No. 2018-238353, filed on Dec. 20, 2018, the entire contents of which are incorporated herein by reference.

FIELD

The embodiments discussed herein are related to an image inspection apparatus, an image inspection learning method, and a non-transitory computer-readable storage medium storing an image inspection program.

BACKGROUND

In the appearance inspection and the like of industrial products, the appearance of the industrial products is imaged by using an imaging apparatus to determine the presence or absence of a defect. In a factory automation (FA) field, noise, shadows, brightness fluctuations, and the like depending on the imaging environment of a site often affect the image, and in order to extract a defective portion, an image processing program is used to which an image processing algorithm is applied. The image processing program uses a combination of image processes for executing smoothing processing, edge extraction processing, binarization processing, and the like on an image captured with a camera or the like.

It is known that such image processing is generated by evolutionary computation based on genetic programming. For example, learning by genetic programming which uses an original image and a target recognition result as inputs generates an image processing program that optimizes, for example, the processing order of image processes and accurately detects defects from captured images.

Note that genetic programming is a model of the evolution process of living organisms, and is a technique of generating new image processes by performing a crossover process and a mutation process on a tree-structured image process. The new image processes with high fitness and the initial image processes are exchanged, and the above-described steps are repeated to change the image processing generations, thereby searching for the optimum image processing.

Examples of the related art include Japanese Laid-open Patent Publication No. 2008-204102, and Japanese Laid-open Patent Publication No. 2008-299687.

SUMMARY

According to an aspect of the embodiments, an image inspection learning method implemented by a computer, the method includes: generating non-defective region data obtained by extracting, from a learning image including a defective region, a non-defective region other than the defective region; inputting the learning image into an image processing program for image inspection that detects the defective region in an input image as a detection target for the defective region, and acquiring an output image; extracting a feature quantity for a predetermined region of the output image; classifying, based on the non-defective region data, the feature quantity for the predetermined region into a non-defective feature quantity corresponding to the non-defective region and a defective feature quantity corresponding to the defective region; and using the non-defective feature quantity to learn a discriminator that discriminates a region of the output image outputted from the image processing program.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the above technique generates a correct image used for evaluation of the image processing program each time the image processing program is reconstructed. Therefore, teaching work frequently occurs and the learning load is high.

For example, in the case of applying the image processing program to, for example, an appearance inspection apparatus for inspecting the appearance of industrial products, the inspection environment changes at each stage, such as the stage of developing the apparatus, the stage of manufacturing the apparatus, and the stage of changing specifications of components. Therefore, the image processing program is reconstructed each time. The image processing program is evaluated based on a difference between an output image obtained from the input image and a correct image that is teaching information prepared in advance. Since the evaluation is performed at pixel level, a teaching error near the boundary between the defective region and the normal region greatly affects the evaluation accuracy.

For this reason, when the quality of the correct image prepared in advance is not high, the learning accuracy by genetic programming is lowered, and the quality of the image processing program is lowered. However, it is difficult to accurately determine the boundary between the defective region and the normal region even with specialized knowledge, and generating a correct image, which is teaching information, each time the inspection environment changes has a very heavy workload.

In one aspect, an object is to provide an image inspection apparatus, an image inspection learning method, and an image inspection program that are capable of reducing the learning load of an image processing program for image inspection.

According to an embodiment, it is possible to reduce the learning load of an image processing program for image inspection.

Hereinafter, embodiments of an image inspection apparatus, an image inspection learning method, and an image inspection program disclosed herein are described in detail based on the drawings. The present embodiment is not limited by this example. Each Example may be appropriately combined within a consistent range.

Embodiment 1

[Explanation of Image Inspection Apparatus]

Figure 1:
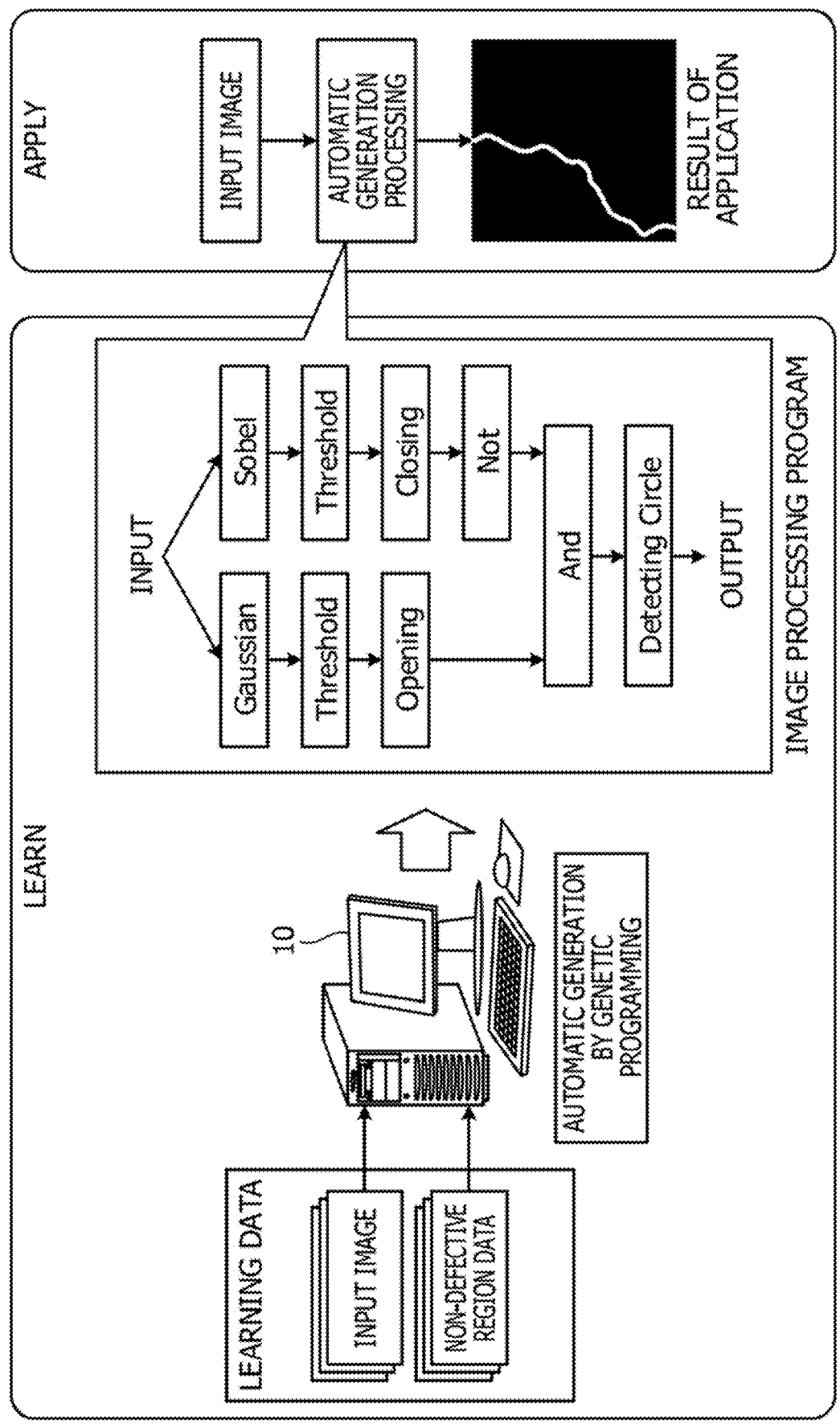
FIG. 1 is a diagram for explaining an image inspection apparatus according to Embodiment 1.

FIG. 1 is a diagram for explaining an image inspection apparatus 10 according to Embodiment 1. The image inspection apparatus 10 illustrated in FIG. 1 is an example of a computer apparatus which executes, using genetic programming (GP), optimization of image processes included in an image processing program that extracts a defective portion from an input image. Note that, in the embodiments, a defective portion region may be described as a defective region, and a non-defective portion region outside the defective region may be described as a non-defective region.

In the learning phase, the image inspection apparatus 10 uses learning data including teaching information to evaluate the fitness of the image processing program selected by genetic programming, and executes optimization by genetic programming according to the evaluation results. In the application phase, the image inspection apparatus 10 inputs an input image to be detected into the optimized image processing program with high fitness, and acquires an extraction image of a defective portion as an application result.

Figure 2:
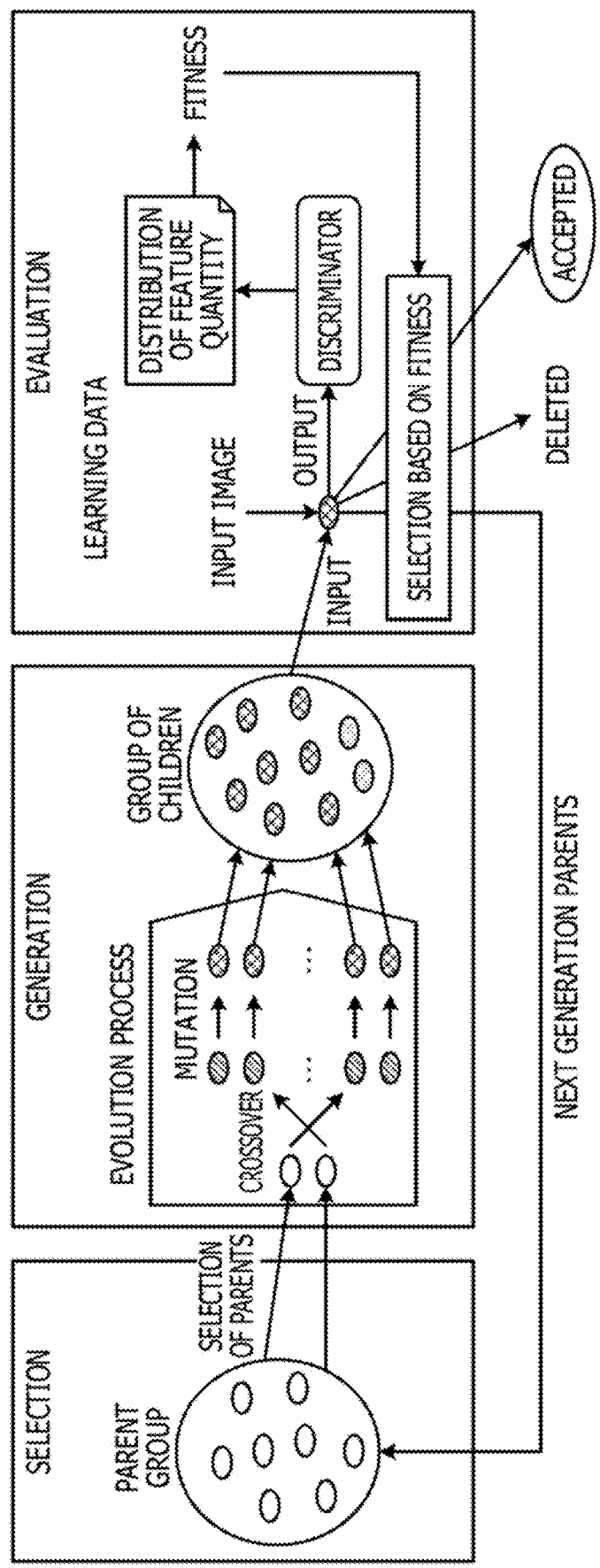
FIG. 2 is a diagram for explaining optimization using genetic programming.

Next, optimization by genetic programming is described. FIG. 2 is a diagram for explaining optimization using genetic programming. As illustrated in FIG. 2, genetic programming randomly selects two individuals as parents from a group of parents including two or more image processing programs (individuals). Subsequently, genetic programming undergoes an evolution process involving, for example, a crossover process and a mutation process to generate a new individual group (child group). Thereafter, genetic programming selects an image processing program from a new group of individuals, and executes evaluation processing including fitness calculation and the like.

Figure 3:
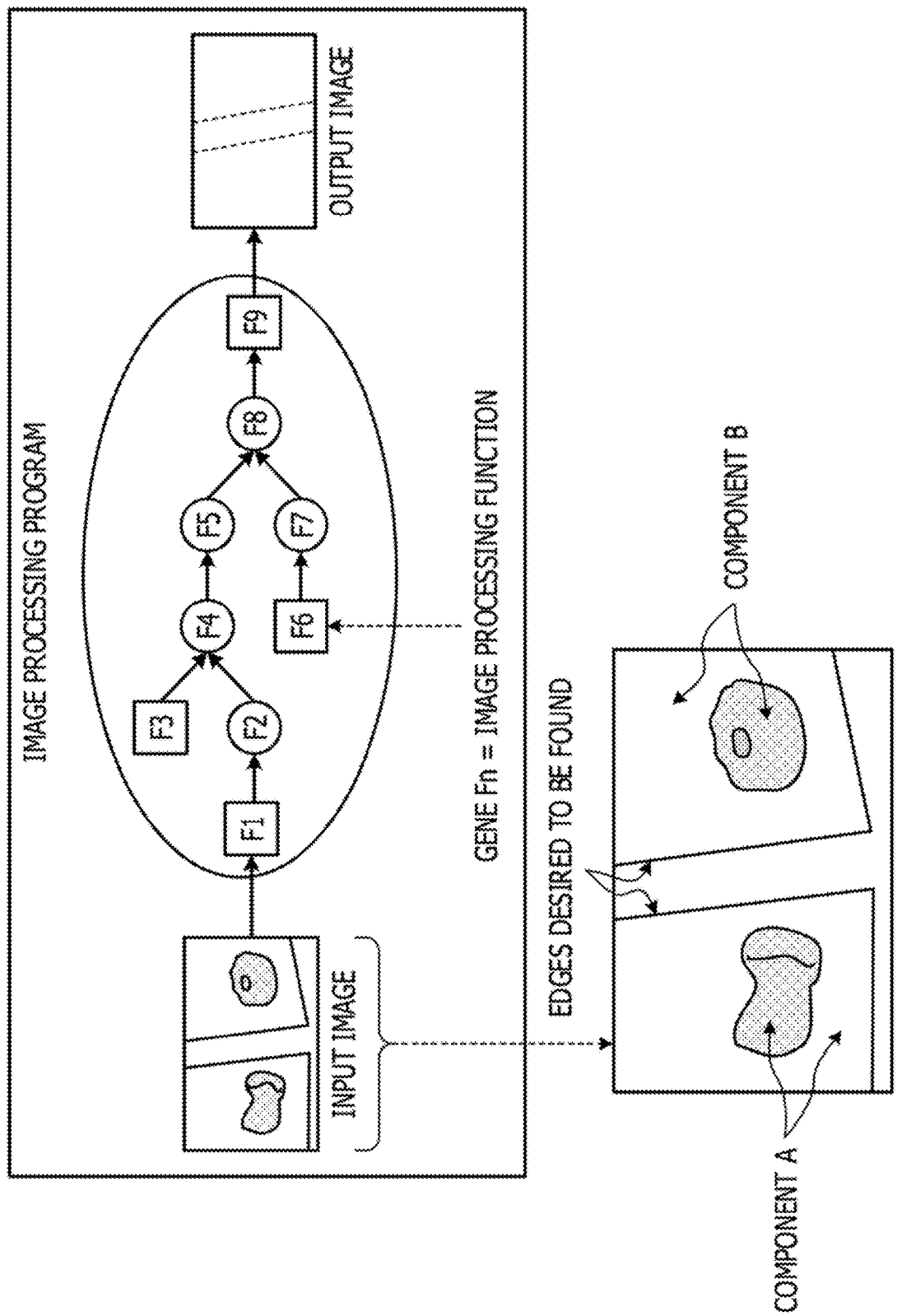
FIG. 3 is diagram for explaining an image processing program.

The image processing program to be optimized is an example of a program that detects a defect or the like from an input image. FIG. 3 is diagram for explaining an image processing program. As illustrated in FIG. 3, the image processing program has a tree structure having image processing functions represented by genes Fn as nodes. The tree structure of the image processing program illustrated in FIG. 3 has a node F1 for inputting an input image before image processing and a node F9 for outputting an output image P2 after image processing, and has nodes F2 to F8 therebetween. Each of the nodes F1 to F9 is a predetermined program module or arithmetic expression.

For example, the image processing program executes the image processes of the node F1 to the node F9 on the input image including component A and component B, and outputs an output image as a result of extracting the edges of component A and component B. Note that the structure of the image processing program is not limited to that illustrated in FIG. 1. Such an image processing program is also referred to as an image processing filter.

The image inspection apparatus 10 evaluates such an image processing program, and generates an image processing program with high fitness. Specifically, the image inspection apparatus 10 calculates local feature quantities from learning data (input image) used for the image processing program currently selected as a determination target, and learns the discriminator by unsupervised learning so as to discriminate, among the local feature quantities, the feature quantity of a non-defective region that does not correspond to a defective region. The image inspection apparatus 10 then determines the fitness of the currently selected image processing program using the learned discriminator.

When the fitness is less than a threshold value, the image inspection apparatus 10 selects the next image processing program by the genetic program and executes the same processing. Thereafter, when an image processing program whose fitness is equal to or greater than a threshold value is searched for, the image inspection apparatus 10 specifies the image processing program for image inspection. As described above, the image inspection apparatus 10 generates an image processing program with high discrimination accuracy by performing learning of the image processing program by genetic programming and learning of a discriminator which discriminates an output of the image processing programming.

[Functional Configuration]

Figure 4:
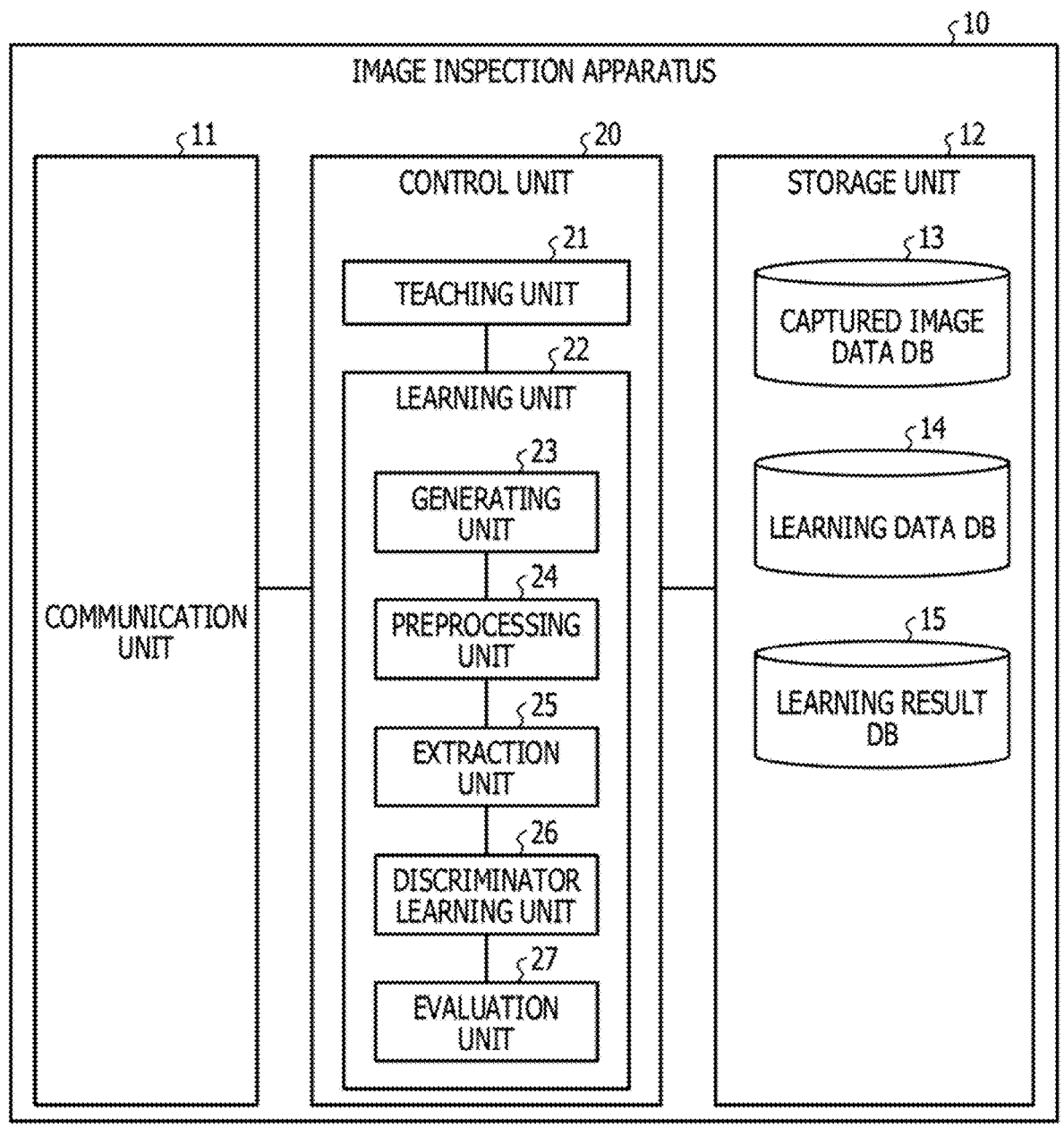
FIG. 4 is a functional block diagram illustrating a functional configuration of the image inspection apparatus according to Embodiment 1.

FIG. 4 is a functional block diagram illustrating a functional configuration of the image inspection apparatus 10 according to Embodiment 1. As illustrated in FIG. 4, the image inspection apparatus 10 includes a communication unit 11, a storage unit 12, and a control unit 20.

The communication unit 11 is a processing unit for controlling communication with the other device, for example, a communication interface. For example, the communication unit 11 receives a captured image captured by an imaging device such as a camera.

The storage unit 12 is an example of a storage device storing data and a program that is executed by the control unit 20. The storage unit 12 is, for example, a memory, a hard disk, or the like. The storage unit 12 stores a captured image data DB 13, a learning data DB 14, and a learning result DB 15.

The captured image data DB 13 is a database storing captured image. For example, the captured image data DB 13 stores a captured image acquired by the communication unit 11 including a captured image inputted at the time of detection target (discrimination target).

The learning data DB 14 is a database storing learning data including input images and teaching information used for learning. For example, the learning data DB 14 stores learning datasets each having a set of a defect image (input image) including a defective region and a non-defective region data (teaching information) designating a non-defective region not including the defective region of the input image.

The learning result DB 15 is a database storing learning results by the learning unit 22 described later. For example, the learning result DB 15 stores optimization results by genetic programming for optimizing the image processing program and learning results such as a one-class support vector machine for learning the discriminator.

The control unit 20 is a processing unit responsible for the entire image inspection apparatus 10 and is, for example, a processor or the like. The control unit 20 includes a teaching unit 21 and a learning unit 22. The teaching unit 21 and the learning unit 22 are examples of electronic circuits included in the processor or examples of processes executed by the processor.

The teaching unit 21 is a processing unit which generates non-defective region data that is teaching information included in the learning data and that designates a non-defective region not including the defective region of the input image. Specifically, the teaching unit 21 receives a closed region including defects detected for the defect image as the input image from the teaching operator. The teaching unit 21 then extracts the designated closed region, and stores a region which does not overlap the closed region as non-defective region data.

Figure 5:
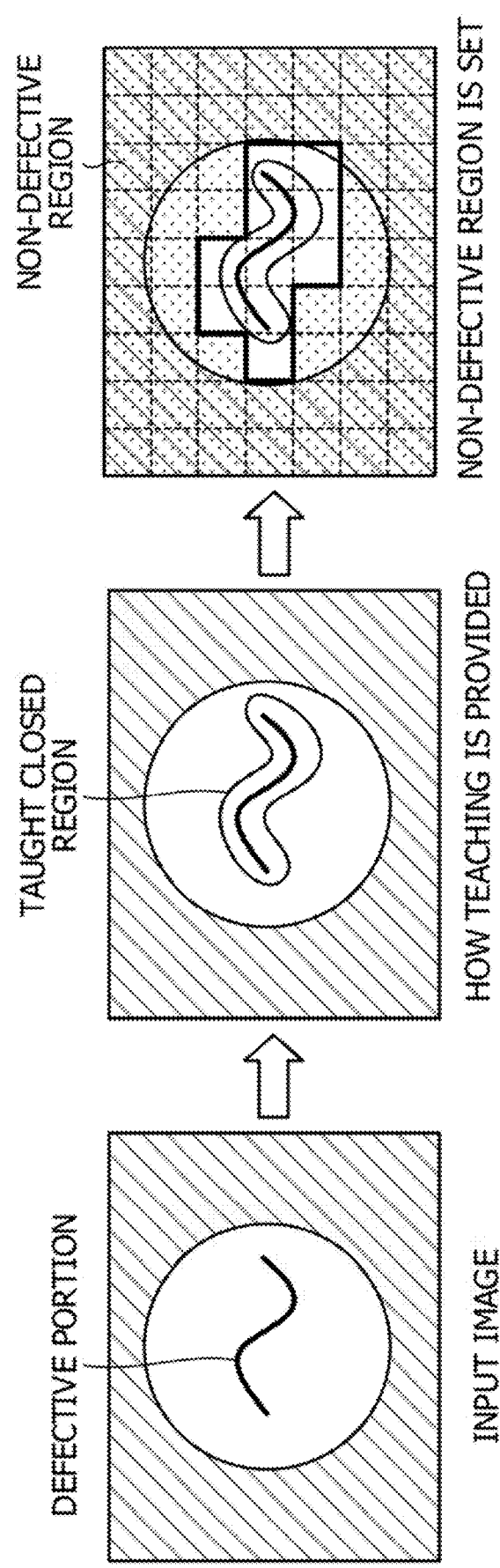
FIG. 5 is a diagram for explaining generation of teaching information.

FIG. 5 is a diagram for explaining generation of teaching information. As illustrated in FIG. 5, the teaching unit 21 receives from the teaching operator the designation of a closed region which includes a defect in the input image including a defective portion. The teaching operator does not have to designate the defective region in detail, and may roughly designate at least a region including the defective region, such as a region including a defective region or a region assumed to include a defective region.

Thereafter, the teaching unit 21 divides the input image into predetermined rectangular regions, and determines whether each of the rectangular regions corresponds to the closed region. The teaching unit 21 generates image data excluding the regions corresponding to the closed region among the rectangular regions, and stores the image data in the learning data DB 14 as non-defective region data. That is, the teaching unit 21 generates teaching information obtained by extracting the region other than the designated closed region from the input image. Note that the teaching unit 21 associates the input image as the extraction source with the non-defective region data, and stores them in the learning data DB 14 as learning data. The teaching unit 21 generates teaching information for each input image for learning.

The learning unit 22 is a processing unit which includes a generating unit 23, a preprocessing unit 24, an extraction unit 25, a discriminator learning unit 26, and an evaluation unit 27, and executes learning using a genetic algorithm or learning using a discriminator to generate an image processing program with high discrimination accuracy.

Figure 6:
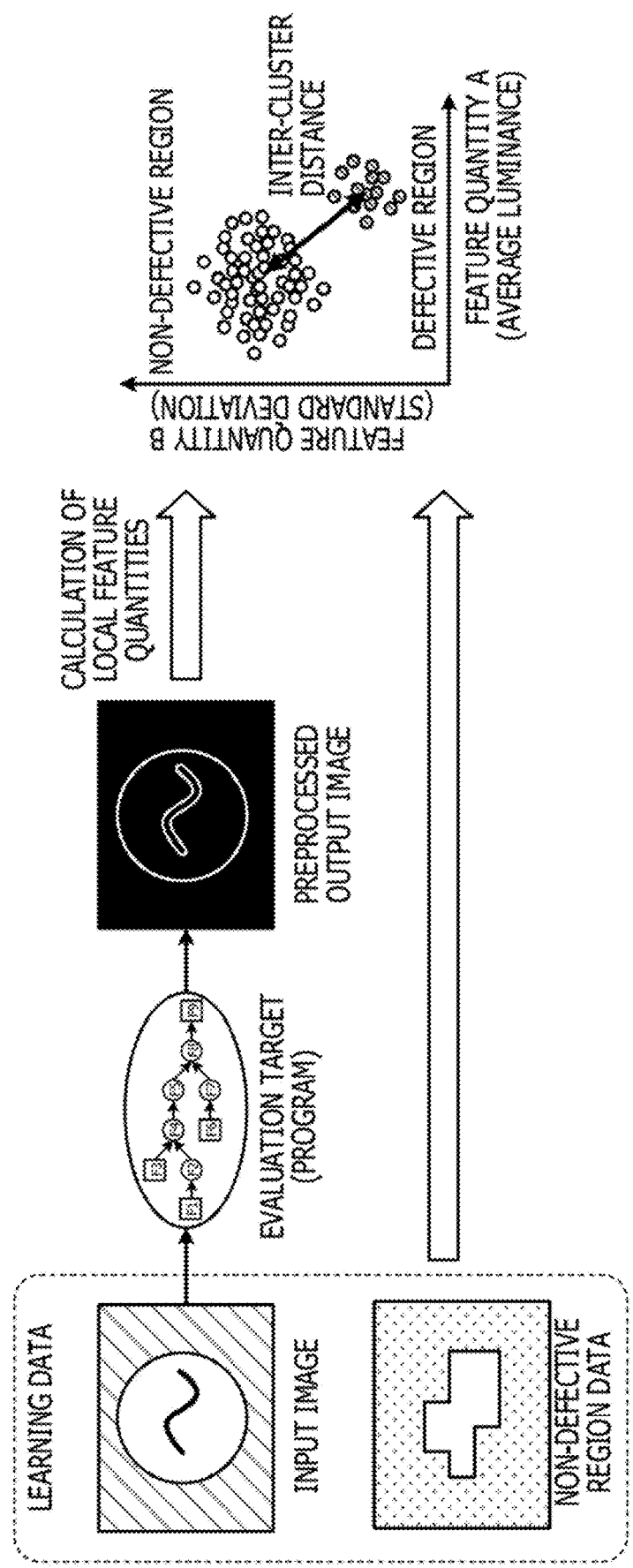
FIG. 6 is a diagram for explaining a learning processing.

FIG. 6 is a diagram for explaining a learning processing. As illustrated in FIG. 6, the learning unit 22 acquires, as learning data, an input image including a defective portion and non-defective region data corresponding to the input image. The learning unit 22 then executes various processes (preprocesses) by the currently selected image processing program on the input image to acquire an output image, and calculates a local feature quantity for each rectangle of the output image.

Thereafter, the learning unit 22 classifies the local feature quantity for each rectangle of the output image according to the teaching information (non-defective region data), and learns the discriminator by unsupervised learning using the classification results. The learning unit 22 then inputs the preprocessed output image to the discriminator, and uses the result to determine the fitness of the image processing program.

Returning to FIG. 4, the generating unit 23 is a processing unit that executes generation of an image processing program using a genetic algorithm. For example, the generating unit 23 executes selection and generation using the genetic algorithm described in FIG. 2, and repeatedly executes a search for an image processing program with high fitness. Note that since it is possible to employ a method similar to a general genetic algorithm in the case of searching for an image processing program, a detailed description thereof is omitted.

The preprocessing unit 24 is a processing unit which executes preprocessing on an input image prior to pre-evaluation using the image processing program that is the fitness evaluation target selected by the generating unit 23. For example, the preprocessing unit 24 acquires a set of the input image and non-defective region data from the learning data DB 14. The preprocessing unit 24 then inputs an input image to the image processing program that is the evaluation target, and acquires an output image on which various processes (preprocesses) by the image processing program have been executed. Thereafter, the preprocessing unit 24 outputs the output image to the extraction unit 25, and outputs non-defective region data as teaching information to the discriminator learning unit 26.

The extraction unit 25 is a processing unit which extracts a local feature quantity from the output image acquired from the preprocessing unit 24. For example, the extraction unit 25 divides the output image into rectangles. Here, the extraction unit 25 preferably divides into the same sizes as those of the rectangles divided by the teaching unit 21 in order to match the number of divisions with that of the teaching information.

For each rectangular region of the divided output image, the extraction unit 25 calculates the average of the luminance values in the region (feature quantity A) and the standard deviation of the luminance values in the region (feature quantity B). Thereafter, the extraction unit 25 outputs the calculation results to the discriminator learning unit 26.

The discriminator learning unit 26 is a processing unit which uses the extraction results by the extraction unit 25 to learn a discriminator that discriminates a partial region of the preprocessed output image. For example, the discriminator learning unit 26 uses the non-defective region data of the learning data to classify the local feature quantities extracted by the extraction unit 25 (the feature quantity A and the feature quantity B) into a feature quantity corresponding to the non-defective region (non-defective feature quantity) and a feature quantity not corresponding to the non-defective region (defective feature quantity).

The discriminator learning unit 26 then uses only the non-defective feature quantity to learn a discriminator which discriminates the output image as a partial region. More specifically, the discriminator learning unit 26 learns a discriminator using a technique such as one-class SVM.

The evaluation unit 27 is a processing unit which uses the discriminator learned by the discriminator learning unit 26 to perform discrimination of a partial region on the output image generated by the preprocessing unit 24, and evaluates the image processing program as the evaluation target according to the discrimination results.

For example, the evaluation unit 27 acquires an output image from the preprocessing unit 24, inputs the output image to the learned discriminator, and generates a distribution of feature quantities (the feature quantity A and the feature quantity B). The evaluation unit 27 then divides the distribution of the feature quantities into a non-defective region class and a defective region class, and determines the fitness of the image program based on the inter-cluster distance calculated using a general method.

The evaluation unit 27 determines whether the fitness is equal to or greater than a threshold value based on whether the inter-cluster distance is equal to or greater than a threshold value. When the inter-cluster distance is equal to or greater than the threshold value, it is judged that the generation of an image processing program with high discrimination accuracy has been completed, and the image processing program is stored as a learning result in the learning result DB 15.

Meanwhile, when the inter-cluster distance is less than the threshold value, it is judged that the fitness is low, the image processing program is deleted, and the learning processing by the learning unit 22 described above is repeated for the next generation parents. For example, a predetermined number of individuals, for example two individuals, are extracted from an individual group formed in the evolution process and replace individuals in the initial individual group. The individuals to be extracted are determined by, for example, the best individual selection or roulette selection. Thereafter, the above learning processing is executed to continue the generation of an image processing program with high fitness and high discrimination accuracy.

[Flow of Overall Process]

Figure 7:
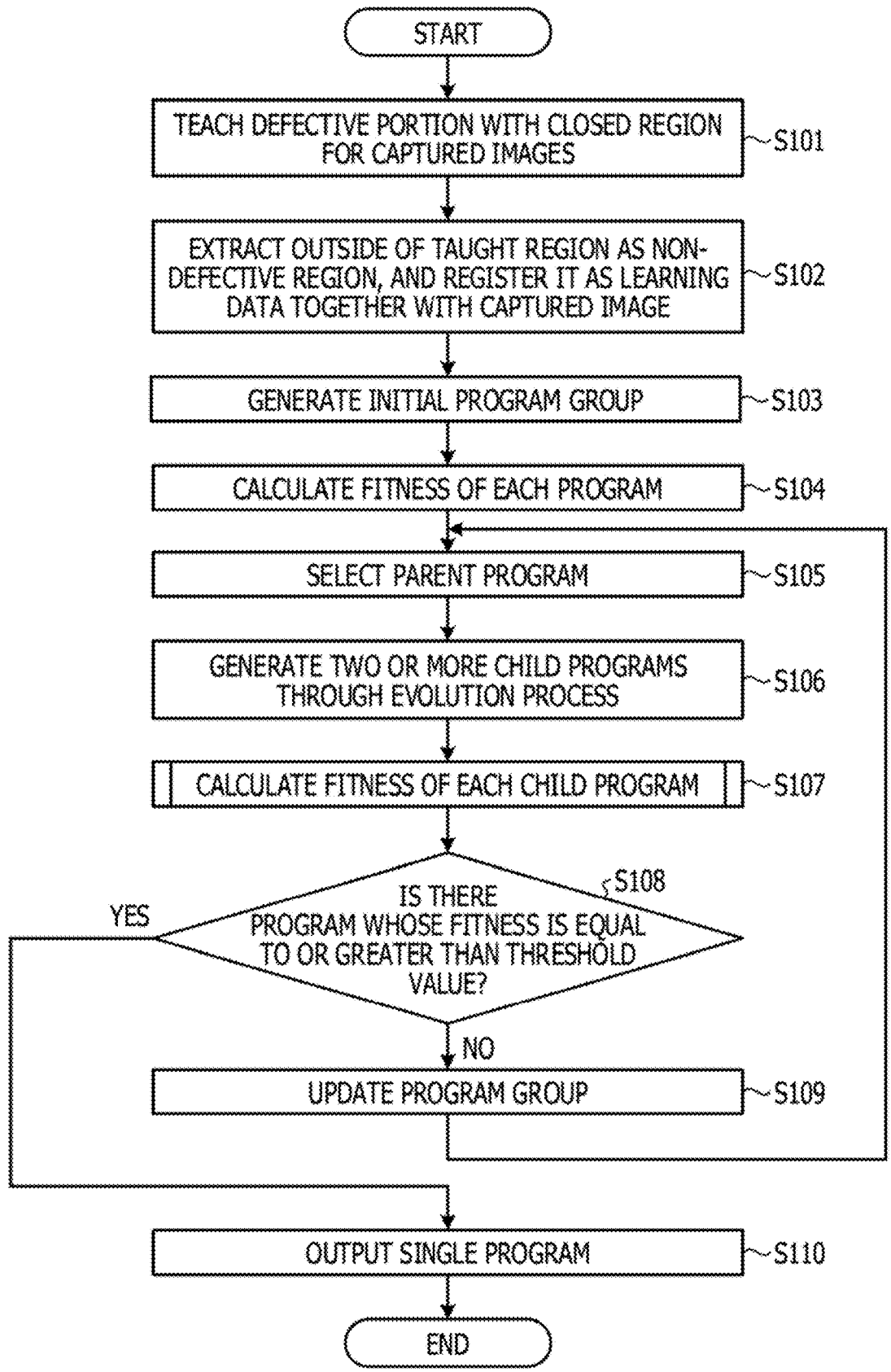
FIG. 7 is a flowchart illustrating a flow of an overall process.

FIG. 7 is a flowchart illustrating a flow of an overall process. As illustrated in FIG. 7, the teaching unit 21 teaches a defective portion with a closed region for each of the captured images (S101). Subsequently, the teaching unit 21 extracts the outside of the taught region as a non-defective region, and registers it as learning data together with the captured image (input image) (S102).

The learning unit 22 generates an initial program group including two or more image processing programs as a group (S103). Subsequently, the learning unit 22 calculates a fitness level by applying an unlearned discriminator and the like to each image processing program (S104), and selects a parent program having a high fitness level (S105). Note that a random selection method may be used instead of S104 and S105.

Thereafter, the learning unit 22 selects two or more child programs through an evolution process by genetic programming (S106), and executes a fitness calculation process for each child program (S107).

When a program having a fitness level equal to or greater than the threshold value is not detected (S108: No), the learning unit 22 updates the program group by genetic programming (S109), and repeats S105 and subsequent steps.

Meanwhile, when a program having a fitness level equal to or greater than the threshold value is detected (S108: Yes), the learning unit 22 outputs the program as a single program (S110). That is, the learning unit 22 stores child programs having a fitness level equal to or greater than a threshold value as a learning result.

[Flow of Fitness Calculation Process]

Figure 8:
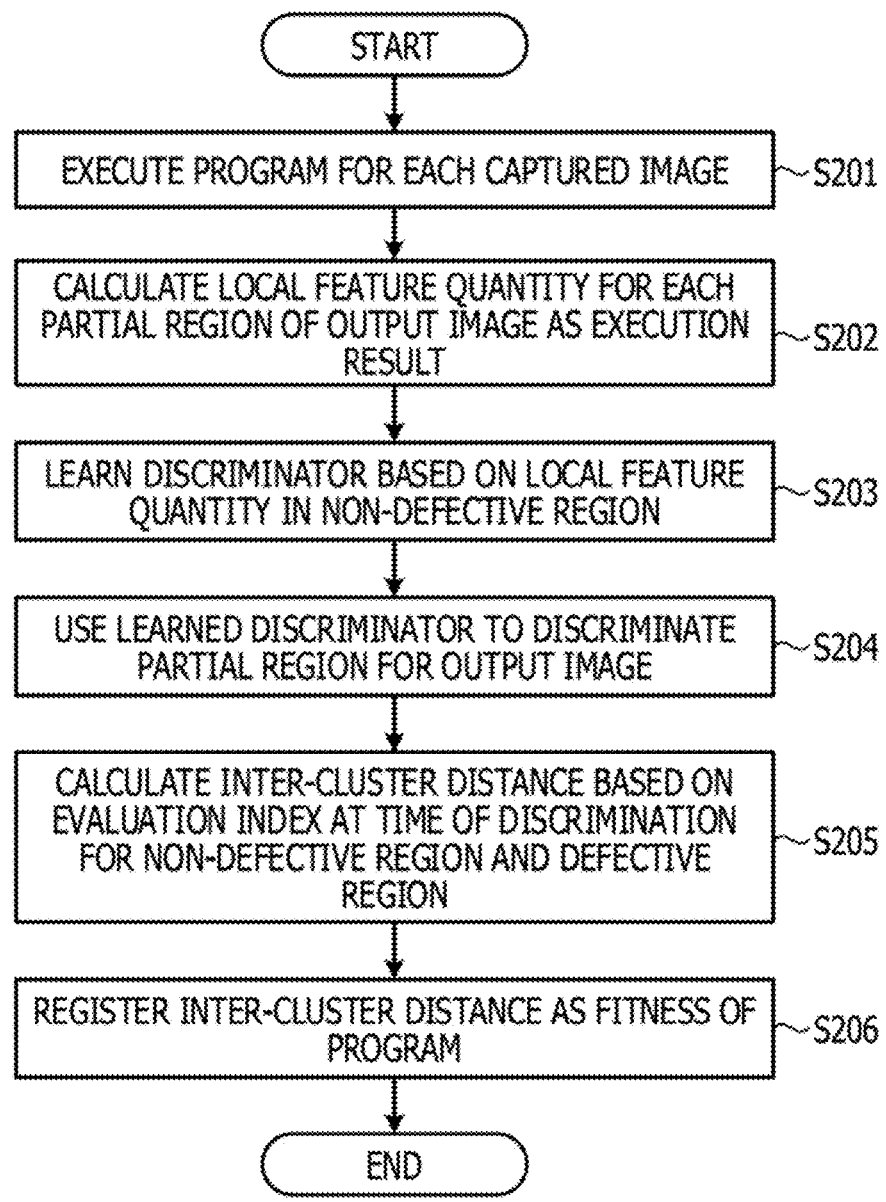
FIG. 8 is a flowchart illustrating a flow of a fitness calculation process.

FIG. 8 is a flowchart illustrating a flow of a fitness calculation process. This process is performed in S107 in FIG. 7.

As illustrated in FIG. 8, the learning unit 22 executes the currently selected image processing program for each captured image (S201), and calculates a local feature quantity for each partial region of the output image as the execution result (S202).

Subsequently, the learning unit 22 learns the discriminator based on the local feature quantity in the non-defective region (S203). Thereafter, the learning unit 22 uses the learned discriminator to discriminate a partial region for the output image (S204).

The learning unit 22 then calculates the inter-cluster distance based on the evaluation index of the discriminator for the non-defective region and the defective region (S205), and registers the inter-cluster distance in the storage unit 12 or the like as the fitness of the program (S206).

[Effects]

As described above, the image inspection apparatus 10 is capable of generating a simple teaching image and optimizing the image processing program. Therefore, even when the image processing program is applied to an appearance inspection apparatus for inspecting the appearance of industrial products, or even when the image inspection environment changes, it is possible to generate teacher data only by generating a simple teaching image. Compared with a general method, it is possible to easily reconstruct the image processing program and to reduce the learning load of the image processing program.

Instead of the processing for comparing the output results of the image processing program with the teaching image as in common techniques, it is possible to determine the fitness using the learning results by the discriminator. For those reasons, it is possible to determine the fitness using a simple teaching image without using a teaching image in which defective regions are correctly designated without omission. Since it is possible to execute both the search for an image processing program by the genetic algorithm and the learning of the discriminator using the same learning data, it is possible to shorten the time required for collecting learning data.

Embodiment 2

Although the embodiment of the disclosed technique has been described, the disclosed technique may be implemented by various different embodiments other than the above-described embodiment.

[Feature Quantity]

The above-described embodiment is an example which uses, as feature quantities, the average of the luminance values in the region and the standard deviation of the luminance values in the region, but the present disclosure is not limited to this, and it is possible to use, for example, the maximum and minimum luminance values in the region, a histogram for color information in each region, spatial frequency information, luminance gradient information, and the like. It is possible to use the feature quantities to be used in any combination, and three or more feature quantities may be used.

[Learning of Discriminator]

The above-described learning of the discriminator may be executed at any timing. For example, learning may be performed before searching for an image processing program by genetic programming, learning may be performed in parallel with searching for an image processing program by genetic programming, or learning of the discriminator may be executed as a series of learning processes by searching for an image processing program by genetic programming. After the learning of the discriminator once, when learning at each inspection stage is omitted and the same learned discriminator is used, it is possible to shorten the entire learning time.

The above-described embodiment is an example which divides the input image into the predetermined rectangular regions, but does not limit the division of the input image into rectangles or the dividing method, and it is possible to employ other techniques allowing division into regions. The learning method of the discriminator is not limited to the one-class SVM, and various known methods may be employed.

[System]

Processing procedures, control procedures, specific names, information including various kinds of data and parameters represented in the documents or drawings may be optionally changed unless otherwise specified.

In addition, each configuration elements of each device illustrated in the drawings is functionally conceptual, and is not necessarily physically configured as similar as the drawing. In other words, the specific form of distribution or integration of each device is not limited to those illustrated in the drawings. That is, all or a part of them may be configured to be functionally or physically distributed or integrated into optional units according to various loads, usage conditions, or the like. For example, it is possible to achieve an apparatus which executes the learning phase and an apparatus which executes the application phase on the same server.

All or a part of each processing function performed in each device may be realized by a CPU and a program that is analyzed and executed by the CPU, or may be realized as hardware by wired logic.

[Hardware]

Figure 9:
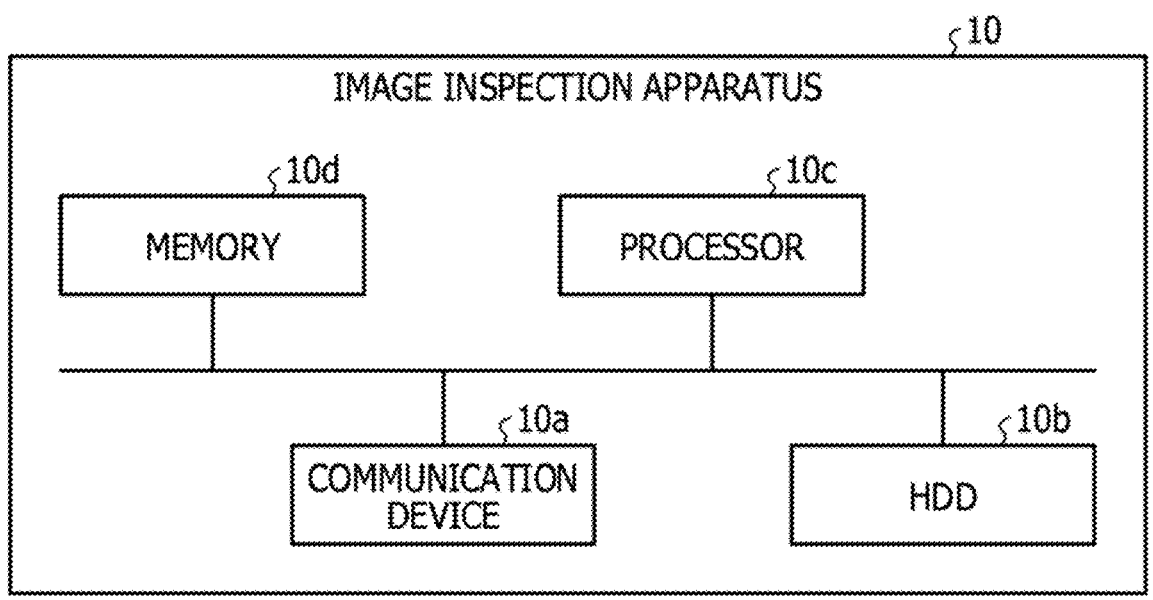
FIG. 9 is a diagram for explaining an example of a hardware configuration.

FIG. 9 is a diagram for explaining an example of a hardware configuration. As illustrated in FIG. 9, the image inspection apparatus 10 includes a communication device 10a, a hard disk drive (HDD) 10b, a memory 10c, and a processor 10d. Respective parts illustrated in FIG. 9 are mutually coupled to each other by a bus or the like.

The communication device 10a is a network interface card or the like, and performs communication with other servers. The HDD 10b stores a program or a DB for operating a function illustrated in FIG. 2.

The processor 10d reads, from the HDD 10b or the like, a program for executing substantially the same processes as those of the processing units illustrated in FIG. 2 and loads the program into the memory 10c, thereby executing a process of performing the functions described with reference to FIG. 2 and so on. For example, this process performs substantially the same functions as the processing units included in the image inspection apparatus 10. Specifically, the processor 10d reads out a program having the same functions as those of the teaching unit 21, the learning unit 22, or the like from the HDD 10b and the like. The processor 10d executes processing of executing the same processing as those of the teaching unit 21, the learning unit 22, or the like.

Thus, the image inspection apparatus 10 operates as an information processing apparatus that performs an image inspection method by reading and executing a program. The image inspection apparatus 10 may achieve substantially the same functions as those in the embodiment described above by reading the program from a recording medium by using a medium reading device and executing the read program. The program according to another embodiment is not limited to a program that is executed by the image inspection apparatus 10. For example, the present embodiment may be similarly applied to a case where another computer or server executes the program, or a case where these cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image inspection apparatus comprising:
   a memory;
   a processor coupled to the memory, the processor being configured to
   execute a generating processing that includes generating non-defective region data obtained by extracting, from a learning image including a defective region, a non-defective region other than the defective region,
   execute an acquisition processing that includes inputting the learning image into an image processing program for image inspection that detects the defective region in an input image as a detection target for the defective region, and which acquires an output image,
   execute an extraction processing that includes extracting a feature quantity for a predetermined region of the output image,
   execute a classification processing that includes classifying, based on the non-defective region data, the feature quantity for the predetermined region into a non-defective feature quantity corresponding to the non-defective region and a defective feature quantity corresponding to the defective region, and
   execute a learning processing that includes using the non-defective feature quantity to train a discriminator that discriminates a region of the output image outputted from the image processing program, the learning processing is configured to:
   cluster the non-defective feature quantity and the defective feature quantity; and
   train the discriminator by unsupervised learning using the non-defective feature quantity so that a non-defective feature quantity cluster and a defective feature quantity cluster are separated from each other.

2. The image inspection apparatus according to claim 1, wherein the learning processing is configured to:
   cluster the non-defective feature quantity and the defective feature quantity to obtain a non-defective feature quantity cluster and a defective feature quantity cluster; and
   train the discriminator by unsupervised learning using the non-defective feature quantity without using the defective feature quantity so that the non-defective feature quantity cluster and the defective feature quantity cluster are separated from each other.

3. The image inspection apparatus according to claim 1, wherein the generating processing is configured to receive designation of a region including a defective portion and a region assumed to include the defective portion among regions of the learning image, and generates the non-defective region data by removing the designated regions from the learning image.

4. The image inspection apparatus according to claim 1, wherein the processor is configured to execute an evaluation processing that includes
   inputting the learning image into the image processing program, selected by genetic programming, to acquire an output image,
   clustering the non-defective feature quantity and the defective feature quantity obtained by inputting the output image to the learned discriminator, and evaluating fitness of the image processing program based on an inter-cluster distance between the non-defective feature quantity cluster and the defective feature quantity cluster.

5. The image inspection apparatus according to claim 4, wherein the evaluation processing is configured to
update a tree structure which indicates image processing content of the image processing program through genetic evolution by the genetic programming until detection of an image processing program whose fitness is equal to or greater than a threshold value, and repeatedly execute evaluation of the fitness on the updated image processing program.

6. The image inspection apparatus according to claim 1, wherein, the extraction processing is configured to extract, for a predetermined region of the output image, an average of luminance values in the region and a standard deviation of luminance values in the region.

7. An image inspection learning method implemented by a computer, the method comprising:
executing a generating processing that includes generating non-defective region data obtained by extracting, from a learning image including a defective region, a non-defective region other than the defective region;
executing an acquisition processing that includes inputting the learning image into an image processing program for image inspection that detects the defective region in an input image as a detection target for the defective region, and acquiring an output image;
executing an extraction processing that includes extracting a feature quantity for a predetermined region of the output image;
executing a classification processing that includes classifying, based on the non-defective region data, the feature quantity for the predetermined region into a non-defective feature quantity corresponding to the non-defective region and a defective feature quantity corresponding to the defective region; and
executing a learning processing that includes using the non-defective feature quantity to learn a discriminator that discriminates a region of the output image outputted from the image processing program, the learning processing is configured to:
cluster the non-defective feature quantity and the defective feature quantity; and
train the discriminator by unsupervised learning using the non-defective feature quantity so that a non-defective feature quantity cluster and a defective feature quantity cluster are separated from each other.

8. The image inspection learning method according to claim 7, wherein the learning processing is configured to:
cluster the non-defective feature quantity and the defective feature quantity to obtain a non-defective feature quantity cluster and a defective feature quantity cluster; and
train the discriminator by unsupervised learning using the non-defective feature quantity without using the defective feature quantity so that the non-defective feature quantity cluster and the defective feature quantity cluster are separated from each other.

9. The image inspection learning method according to claim 7, wherein the generating processing is configured to receive designation of a region including a defective portion and a region assumed to include the defective portion among regions of the learning image, and generates the non-defective region data by removing the designated regions from the learning image.

10. The image inspection learning method according to claim 7, further comprising:
executing an evaluation processing that includes
inputting the learning image into the image processing program, selected by genetic programming, to acquire an output image,
clustering the non-defective feature quantity and the defective feature quantity obtained by inputting the output image to the learned discriminator, and
evaluating fitness of the image processing program based on an inter-cluster distance between the non-defective feature quantity cluster and the defective feature quantity cluster.

11. The image inspection learning method according to claim 10, wherein the evaluation processing is configured to
update a tree structure which indicates image processing content of the image processing program through genetic evolution by the genetic programming until detection of an image processing program whose fitness is equal to or greater than a threshold value, and repeatedly execute evaluation of the fitness on the updated image processing program.

12. The image inspection learning method according to claim 7, wherein, the extraction processing is configured to extract, for a predetermined region of the output image, an average of luminance values in the region and a standard deviation of luminance values in the region.

13. A non-transitory computer-readable storage medium for storing an image inspection program which causes a processor to perform processing for object recognition, the processing comprising:
executing a generating processing that includes generating non-defective region data obtained by extracting, from a learning image including a defective region, a non-defective region other than the defective region;
executing an acquisition processing that includes inputting the learning image into an image processing program for image inspection that detects the defective region in an input image as a detection target for the defective region, and acquiring an output image;
executing an extraction processing that includes extracting a feature quantity for a predetermined region of the output image;
executing a classification processing that includes classifying, based on the non-defective region data, the feature quantity for the predetermined region into a non-defective feature quantity corresponding to the non-defective region and a defective feature quantity corresponding to the defective region; and
executing a learning processing that includes using the non-defective feature quantity to train a discriminator that discriminates a region of the output image outputted from the image processing program, the learning processing is configured to:
cluster the non-defective feature quantity and the defective feature quantity; and
train the discriminator by unsupervised learning using the non-defective feature quantity so that a non-defective feature quantity cluster and a defective feature quantity cluster are separated from each other.

14. The non-transitory computer-readable storage medium according to claim 13, wherein the learning processing is configured to:
cluster the non-defective feature quantity and the defective feature quantity to obtain a non-defective feature quantity cluster and a defective feature quantity cluster; and train the discriminator by unsupervised learning using the non-defective feature quantity without using the defective feature quantity so that the non-defective feature quantity cluster and the defective feature quantity cluster are separated from each other.

15. The non-transitory computer-readable storage medium according to claim 13, wherein the generating processing is configured to receive designation of a region including a defective portion and a region assumed to include the defective portion among regions of the learning image, and generates the non-defective region data by removing the designated regions from the learning image.

16. The non-transitory computer-readable storage medium according to claim 13, further comprising:
    executing an evaluation processing that includes
        inputting the learning image into the image processing program, selected by genetic programming, to acquire an output image,
        clustering the non-defective feature quantity and the defective feature quantity obtained by inputting the output image to the learned discriminator, and
        evaluating fitness of the image processing program based on an inter-cluster distance between the non-defective feature quantity cluster and the defective feature quantity cluster.

17. The non-transitory computer-readable storage medium according to claim 16, wherein the evaluation processing is configured to
    update a tree structure which indicates image processing content of the image processing program through genetic evolution by the genetic programming until detection of an image processing program whose fitness is equal to or greater than a threshold value, and
    repeatedly execute evaluation of the fitness on the updated image processing program.

18. The non-transitory computer-readable storage medium according to claim 13, wherein, the extraction processing is configured to extract, for a predetermined region of the output image, an average of luminance values in the region and a standard deviation of luminance values in the region.

\* \* \* \* \*